(12) United States Patent
Kumar et al.

(10) Patent No.: US 6,541,109 B1
(45) Date of Patent: Apr. 1, 2003

(54) RELEASE COATING FORMULATION PROVIDING LOW ADHESION RELEASE SURFACES FOR PRESSURE SENSITIVE ADHESIVES

(75) Inventors: Ramesh C. Kumar, Maplewood, MN (US); Elda T. G. Bloemendal, Maplewood, MN (US); Bruce C. Schmidt, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/415,684

(22) Filed: Oct. 8, 1999

(51) Int. Cl.$^7$ .............................. B32B 9/00; B32B 9/04; C08L 83/10; C08L 53/00
(52) U.S. Cl. ............. 428/352; 106/287.11; 106/287.13; 428/447; 428/500; 525/100; 525/101; 525/431; 525/446; 525/464
(58) Field of Search ................................ 525/100, 101, 525/431, 446, 464; 428/413, 414, 447, 500; 106/287.13, 287.11

(56) References Cited

U.S. PATENT DOCUMENTS

| | | | |
|---|---|---|---|
| 5,032,460 A | 7/1991 | Kantner et al. | |
| 5,057,619 A | 10/1991 | Kumar et al. | |
| 5,089,336 A | 2/1992 | Kumar et al. | |
| 5,154,962 A | 10/1992 | Mertens et al. | |
| 5,200,436 A | 4/1993 | Kumar et al. | |
| 5,202,190 A | 4/1993 | Kantner et al. | |
| 5,217,758 A | 6/1993 | Greenleaf et al. | |
| 5,380,905 A | 1/1995 | Haidos et al. | |
| 5,523,373 A | * 6/1996 | Esselborn et al. | |
| 6,268,440 B1 | * 7/2001 | Kudo et al. | |
| 6,440,572 B1 | * 8/2002 | Yokoyama et al. | ......... 428/447 |

FOREIGN PATENT DOCUMENTS

| | | |
|---|---|---|
| EP | 0 371 633 A | 6/1990 |
| EP | 0 413 457 A | 2/1991 |
| EP | 0 559 575 | 9/1993 |
| NL | 9 100 226 A | 9/1992 |
| WO | WO 99/02611 | 1/1999 |
| WO | WO 99/11683 | 3/1999 |
| WO | WO 99/36481 | 7/1999 |
| WO | WO 96/40833 | 12/2000 |

* cited by examiner

*Primary Examiner*—Robert Dawson
*Assistant Examiner*—Marc S Zimmer
(74) *Attorney, Agent, or Firm*—Lisa Fagan

(57) ABSTRACT

Release coating formulations and release coatings derived therefrom that incorporate a blend of a silicone vinyl copolymer and a second polymer for which the release qualities are extremely stable over time. The silicone vinyl copolymer and the second polymer include complementary crosslinkable functionality allowing interpolymer crosslinks to be formed.

51 Claims, No Drawings

RELEASE COATING FORMULATION PROVIDING LOW ADHESION RELEASE SURFACES FOR PRESSURE SENSITIVE ADHESIVES

FIELD OF THE INVENTION

The present invention relates to release coatings and coatable formulations used to form release coatings. More specifically, the present invention relates to release coatings and corresponding, coatable formulations incorporating a silicone-vinyl copolymer and a second polymer, wherein the combination provides the release coating with water compatibility, ink receptivity, stability, and the improved ability to preserve and maintain characteristics (e.g., readhesion characteristics in the case of adhesive tape) of the surfaces being protected by the coating and the like.

BACKGROUND OF THE INVENTION

Many different kinds of products are backed with surfaces formed from pressure sensitive adhesives so that such products can be permanently or releasably attached to other items. There are numerous embodiments of these adhesive-backed products, including bandages, adhesive tapes (masking tape, gaffer's tape, transfer tape, Scotch® brand tape, duct tape, electrical tape, packaging tape, construction tape, medical tape, cloth tape, and the like), floor tiles, labels, mounting brackets, transdermal drug delivery devices, electrode pads for attaching medical devices to patients, retroreflectors, signage, pathway and roadway markings, vehicle emblems, and the like.

Prior to use, the adhesive surfaces of such products must be protected against the environment and against accidental adhesion to other items. Accordingly, adhesive-backed surfaces of these products typically are stored on a release coating that can be easily separated from the adhesive surface when desired. For example, labels are often stored on a sheet-shaped release liner from which the labels can be peeled when ready to be used. Likewise, a release surface is formed on the backing of adhesive tape rolls so that the tape can be unwound and removed from the roll when desired.

Release coatings are expected to reproducibly provide an appropriate level of release from the adhesive of interest, to not deleteriously affect the adhesive, and to be resistant to aging so that the release level remains stable over time. One way of assessing the release qualities of a particular release coating involves comparing the immediate and aged readhesion characteristics of the adhesive surface being protected by the coating. Desirably, the aged readhesion values and the immediate readhesion value are substantially the same. A large change in peel strength upon aging indicates a poorly performing release coating. To evaluate immediate readhesion, an adhesive backed sample is adhered to the release coating. The sample is then immediately peeled off the release coating and applied to clean glass. The force required to peel the sample from the glass is measured. To evaluate aged readhesion, the sample is left on the coating for an extended period, e.g., three days, before being peeled off the coating and tested for peel strength from the clean glass.

Another way of assessing the quality of a release coating involves comparing the immediate peel force and the aged peel force of the protected adhesive surface. To evaluate immediate peel force, a test tape sample is positioned on a coating and immediately peeled off. The force to accomplish this is measured. To evaluate the aged peel force, the test tape sample is left on the release coating for an extended period, e.g., three days. As was the case with the readhesion test, the aged and immediate peel force measurements are desirable substantially the same. A large change in peel force upon aging indicates a poorly performing release coating.

In addition to providing stable, appropriate release over time, release coatings often must satisfy other performance criteria as well. In many applications, a release coating must be solvent resistant, receptive to marking with pencil, ink, and/or paint, and characterized by an appropriate level of gloss or even low gloss. For example, gloss reducing agents are often used to lower gloss in products such as gaffer's tape. However, such agents must be compatible with the formulations from which release coatings are formed. This is particularly challenging for formulations in the form of water-based solutions, dispersions, latex materials, and the like. Such agents also should not unduly compromise the performance of the release coating.

One common approach for forming release coatings involves dissolving or dispersing, as the case may be, polymer materials having good release properties in a suitable solvent. The solution or dispersion is then coated onto a suitable substrate and dried. The resultant coating can then be used to releasably store the desired adhesive-backed item(s). Many polymeric materials with good, inherent release characteristics have been used to form such release coatings. For example, silicone-vinyl copolymers have excellent release characteristics, and release liners incorporating silicone-vinyl copolymers have been described in U.S. Pat. Nos. 5,202,190; 5,200,436; 5,154,962; 5,057,619; 5,089,336; and 5,032,460; as well as in documents cited in the background sections of these patents. Silicone-vinyl copolymers generally include at least one silicone block and at least one vinyl copolymeric block. These copolymers offer many advantages. The silicone blocks form surfaces with good release quality while the vinyl copolymeric blocks help to anchor the release coating to an underlying substrate. The level of release can be easily adjusted by varying the silicone content of the copolymer. The use of more expensive, 100% silicone polymers is avoided. The vinyl copolymeric blocks independently of the silicone blocks can be formed with a wide variety of functionality to enhance performance characteristics without unduly affecting the release quality of the silicone blocks.

Unfortunately, the use of silicone-vinyl copolymers in release coatings does have some drawbacks. When such release coatings are used to protect aggressive adhesives, the integrity of such adhesives can be compromised in some instances due to transfer of the silicone-vinyl copolymer to the adhesive.

The manufacture of release coatings from water-based formulations containing silicone vinyl copolymers has been described, for example, in U.S. Pat. Nos. 5,032,460 and 5,089,336. Water-based formulations advantageously eliminate the environmental concerns, flammability, handling issues, and expense associated with nonaqueous solvents. However, notwithstanding the promise offered by such water-based formulations, obtaining high performance release coatings from water-based formulations has remained a challenge, particularly when the formulation incorporates one or more other polymers blended with the silicone-vinyl copolymer. Often, the blend provides release coating performance that is no better than that provided by the use of a silicone-vinyl copolymer by itself. In some aspects, the release coating performance of blends of the silicone-vinyl copolymer with one or more other polymers has even been worse.

What is needed, therefore, is a way to incorporate silicone-vinyl copolymers into release coatings in a manner effective to maintain the integrity of the pressure sensitive adhesive to be protected by the coating. It would also be desirable to form the coatings from water-based formulations.

SUMMARY OF THE INVENTION

The present invention provides release coating formulations and release coatings derived therefrom that incorporate a blend of a silicone vinyl copolymer and a second polymer for which the release qualities are extremely stable over time. This indicates that the release coating does not unduly compromise the integrity of the pressure sensitive adhesive that is being protected by the release coating. For instance, readhesion force values and peel force values obtained in tests involving the release coatings of the present invention remain substantially stable, even after aging. Significantly, preferred embodiments of the silicone-vinyl copolymer and the second polymer are not only very compatible with each other, but are also very compatible with water. This makes it easy to prepare water-based coating formulations of these materials from which release coatings can be formed. Additionally, release coatings of the present invention provide excellent solvent resistance, are very receptive to marking by pencil, ink, paint, or the like, and are compatible with many beneficial additives such as anti-gloss agents.

The present invention is based, at least in part, upon the discovery that the properties of a release coating incorporating a blend including a silicone-vinyl copolymer and a second polymer can be dramatically improved when second polymer includes functionality that is crosslinkable with functionality on the silicone-vinyl copolymer. For water-based materials, such functionality advantageously may be in the form of ionically crosslinkable moieties. Preferably, these ionically crosslinkable moieties include basic moieties on one of the polymeric materials, and complementary acidic moieties on the other. In some embodiments, each of the silicone-vinyl copolymer and the second polymer may include both acidic and basic moieties that may form advantageous interpolymer crosslinks.

The performance of release coatings of the present invention can be even further improved when the second polymer is large, having a number average molecular weight of at least about 50,000, preferably at least about 100,000. It has also been discovered that the performance of release coatings of the present invention may be improved when the Tg (glass transition temperature in the case of amorphous polymers) or Tm (melting temperature in the case of crystalline polymers) is at least about 45° C. and/or that the second polymer is both miscible and compatible with the vinyl copolymeric block(s) of the silicone-vinyl copolymer.

In particularly preferred embodiments, the silicone-vinyl copolymer and the second polymer contain ionically crosslinkable moities that allow the two polymers to be ionically crosslinked to each other via one or more different kinds of ionic crosslinks, the second polymer is linear and has a number average molecular weight of at least about 50,000, the second polymer has a Tg or Tm, (as the case may be) of greater than about 45° C., and the second polymer is miscible and compatible with the vinyl copolymeric blocks of the silicone-vinyl copolymer.

In one aspect, the present invention relates to a release coating obtained from ingredients including a copolymer ("silicone-vinyl copolymer") comprising at least one silicone block and at least one vinyl copolymeric block. The copolymer comprises a first crosslinkable functionality. The composition further includes a second polymer comprising a second crosslinkable functionality. The first and second crosslinkable functionalities are crosslinkable with each other.

In another aspect, the present invention relates to an adhesive tape having first and second major surfaces. The tape includes a pressure sensitive adhesive layer proximal to the first major surface and a release coating as described above proximal to the second major surface.

In another aspect, the present invention relates to a method of making a release coating. A coatable composition is provided that incorporates the silicone-vinyl copolymer and the second polymer. The coatable composition is caused to form a release coating on a surface of a substrate.

In another aspect, the present invention relates to an antigloss agent comprising fumed silica as well as release coatings and adhesive tapes incorporating fumed silica.

DETAILED DESCRIPTION OF THE PRESENTLY PREFERRED EMBODIMENTS

The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention.

Release coating formulations of the present invention advantageously incorporate a copolymer comprising at least one silicone block ("B" block) and at least one vinyl copolymeric block ("A" block). The term "silicone block" refers to a moiety comprising a backbone segment of the formula

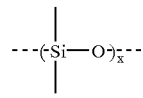

wherein x is sufficiently high on average such that the resultant release coating has the desired surface release characteristics. In preferred silicone blocks, x is sufficiently large such that the silicone block has a number average molecular weight in the range from about 1000 to 80,000, preferably 2000 to 20,000, more preferably 5000 to 15,000.

The term "vinyl copolymeric block" refers to a moiety formed by free radically polymerizing one or more free radically polymerizable monomers. Preferred vinyl copolymeric blocks of a particular silicone-vinyl copolymer taken together cumulatively have a number average molecular weight in the range from about 1000 to 80,000, preferably 2000 to 20,000, more preferably 5000 to 15,000.

Copolymers comprising one or more A blocks and one or more B blocks, referred to hereinafter as "silicone-vinyl copolymers", are beneficially incorporated into release coating formulations due to the cooperative properties of the A and B blocks. On the one hand, the silicone B block(s) of such copolymers have a relatively low surface energy and tend to seek the surface and thereby define the surface qualities of the resultant coatings. Thus, the relatively low surface release values characteristic of silicone blocks are imparted to the resultant surfaces. The relatively higher energy vinyl copolymeric A block(s), on the other hand, tend to reside in the lower regions of the resultant coatings, helping to anchor the release coatings to their underlying substrate surfaces. The A blocks also preferably comprise the functionality that crosslinks with complementary functionality on the second polymer.

Silicone vinyl copolymers of the present invention may have any of a variety of block or graft architectures. For example, silicone-vinyl copolymers of the present invention may have an architecture in which a plurality of A and B blocks are randomly positioned in a polymer backbone. In other embodiments, one or more silicone B blocks can be grafted to a vinyl copolymeric A backbone. Other embodiments involve one or more vinyl copolymeric A blocks grafted to a silicone B block backbone. The present invention also involves simple AB, ABA, and BAB polymeric architectures as well. Silicone vinyl copolymers and a number of different preparation methods for these copolymers have been described in detail in U.S. Pat. Nos. 5,202,190; 5,200,436; 5,154,962; 5,057,619; 5,089,336; and 5,032,460; as well as in documents cited in the background sections of these patents. These U.S. patents are incorporated herein in their entireties for all purposes.

The relative amount of the A and B blocks incorporated into the silicone-vinyl copolymers can vary within a wide range. Typically, a silicone-vinyl copolymer of the present invention includes a sufficient amount of the silicone B block such that the resultant release coating has the desired surface release value. For example, when used in connection with pressure sensitive adhesives, preferred release coatings of the present invention are characterized by surface release values of about 50 N/dm or less. Such surface release values make the release coatings suitable for use with relatively aggressive pressure sensitive adhesives having peel adhesion values on the order of about 100 N/dm or higher. As general guidelines, such surface release characteristics may be obtained when the weight ratio of the vinyl copolymeric A block(s) to the silicone B block(s) of a silicone-vinyl copolymer is, on average, in the range from about 98:2 to 40:60. In the practice of the present invention, the immediate and aged surface release values for a release coating is measured in accordance with the modified standard methodology described in the Examples, below. Peel adhesion values for an adhesive also are measured by the modified methodology described in the Examples, below.

Advantageously, the surface release value of a release coating of the present invention may be easily varied merely by adjusting the silicone content of the silicone-vinyl copolymer. Generally, increasing the silicone content tends to lower the surface release value, whereas reducing the silicone content tends to raise the surface release value. This allows the surface release value to be optimized for use with particular classes of adhesives. The ability to tailor the surface release values over such a wide range allows the use of this polymer to satisfy a wide variety of application needs.

The vinyl copolymeric A block(s) of the silicone-vinyl copolymer may be backbone segments (in the case of block copolymers) and/or pendant chain segments (in the case of graft copolymers in which one or more A blocks are grafted onto a B block) formed from constituents comprising one or more free radically polymerizable monomers, oligomers, and/or polymers. In the practice of the present invention, "free radically polymerizable" refers to functionality directly or indirectly pendant from a monomer, oligomer, or polymer backbone (as the case may be) that participate in polymerization reactions via a free radical mechanism. Representative examples of such free radically polymerizable groups suitable in the practice of the present invention include epoxy groups, the carbon-carbon double bond of (meth)acrylate groups, olefinic carbon-carbon double bonds, the carbon-carbon double bond of allyloxy groups, the carbon-carbon double bond of alpha-methyl styrene groups, the carbon-carbon double bond of (meth)acrylamide groups, cyanate ester groups, the carbon-carbon double bond of vinyl ethers groups, combinations of these, and the like. Any conventional free radical polymerization technique can be used to form the A blocks. In preferred embodiments in which the release coating formulation is water-based, solution polymerization (described in the Examples, below) is preferred.

The term "monomer" as used herein refers to a single, one unit molecule capable of combination with itself or other monomers to form oligomers or polymers. The term "oligomer" refers to a compound that is a combination of 2 to 20 monomer units. The term "polymer" refers to a compound that is a combination of 21 or more monomer units. As used herein, the term "(meth)acryl" means methacryl and/or acryl.

Preferably, the one or more A blocks have a Tg and/or Tm (as the case may be) that is greater than about 45° C. to help ensure that the resultant release coating is non-tacky and to provide the best coating performance in terms of release characteristics and durability. In the practice of the present invention, Tg and Tm are determined using differential scanning calorimetry (DSC) techniques. A suitable procedure for determining Tg and Tm using DSC techniques involves dissolving 1 g of the block copolymer of interest into 1.5 grams of a suitable solvent such as methyl ethyl ketone. The solution is cast into a 70 mm diameter aluminum dish and dried in a forced air oven at 105° C. for 30 minutes. A small amount of the resulting sample is placed into the DSC chamber of a Perkin-Elmer DSC-2 differential scanning calorimeter under a nitrogen atmosphere. The sample is cooled from room temperature to −150° C. with liquid hydrogen and then heated to 150° C. at a rate of 20° C. per minute. For amorphous materials, the Tg is the midpoint of the curve in the glass transition region. For crystalline materials, the sharp peak at the melting point indicates the Tm.

Generally, any free radically polymerizable monomers, oligomers, and/or polymers may be incorporated into the vinyl copolymeric A block. The composition and formulation of each A block may be selected based upon the intended uses and performance standards that the resultant release coating is intended to satisfy. Generally, each A block may be a homopolymeric block, but preferably is a copolymeric block for reasons of obtaining a good balance of performance characteristics, including adhesion to the underlying substrate surface, ink receptivity, water dispersibility, crosslinkability, and the like. Advantageously, by the appropriate selection of the content and formulation, the performance characteristics of the A block(s) can be optimized as desired without undue impact upon the release characteristics of the silicone B block(s).

Accordingly, the content and formulation of the A block may be varied over a wide range. However, the performance characteristics of a silicone-vinyl copolymer can be tailored by incorporating free radically polymerizable materials having certain kinds of functionality into an A block in a manner such that the functionality is preserved and available in the resultant silicone-vinyl copolymer. For example, if the desired A block is intended to have pendant basic and/or acid functionality, then a free radically polymerizable monomer(s) having such basic and/or acid functionality can be copolymerized with the other constituents used to form the A block. As another example, in some embodiments, the silicone-vinyl copolymer is preferably water soluble or water dispersible so that the silicone-vinyl copolymer can be used in water-based formulations. For this purpose, the silicone-vinyl copolymer can be rendered water soluble or dispersible by incorporating an appropriate amount of copolymerizable materials having ionic, basic, and/or acidic functionality into one or more A blocks of the silicone-vinyl copolymer.

To provide a silicone-vinyl copolymer that is water soluble or dispersible, a certain minimum content of ionic, acidic, and/or basic functionality is typically required. The exact content of such functionality tends to vary depending upon factors such as content and formulation of the A and B blocks, the number average molecular weight of the A and B blocks, and the like. However, although such functionality can improve water compatibility, too much of such functionality could adversely affect other performance properties, particularly the stability of the surface release characteristics of the resultant release coating under conditions of high humidity. Accordingly, the ionic, acidic, and/or basic functionality is present in substantially the minimum amount, or perhaps a moderate excess, as is required to achieve the desired level of water compatibility. As recommended guidelines, a suitable level of ionic content is provided by incorporating 1% to 15%, preferably 4% to 10%, by weight of one or more ionic, acidic, and/or basic free radically polymerizable material into the A block, based upon the total weight of the A block.

Alternatively, if it is desired to incorporate a more substantial amount of ionic, acidic, and/or basic functionality into a silicone-vinyl copolymer, this can be done by using ionic groups that are non-permanent in nature. Non-permanent, ionic functionality can be provided by using acid or base functionality in which the functionality can be rendered ionic in aqueous solution depending upon the pH, but reverts back to its original, nonionic state upon drying. Amine and carboxylic acid groups are examples of such groups.

Preferred ionic functionality includes moieties that are ionized or ionizable at a pH in the range from 2 to 10. Representative examples of suitable ionic functionality, as well as suitable acidic and basic functionality, include quaternary ammonium functionality (e.g., —$N^+(CH_3)_3$ as well as materials such as sulfobetaines, e.g., —$N^+(CH_3)_2$ ($CH_2CH_2CH_2SO_3^-$); amines (e.g., —$N(CH_3)_2$), the heterocyclic moiety of n-vinyl pyrolidone; heterocyclic moieties as described in U.S. Pat. No. 5,081,213; salts or acids based on sulfate (e.g., —$OSO_3Na$), salts or acids based on sulfonate (e.g., —$SO_3Na$), salts or acids based on phosphate (e.g., —$OPO(OH)_2$), salts or acids based on phosphonate (e.g., —$PO(OH)_2$), salts or acids based on carboxyl (e.g., —COOH or —COONa), mixtures thereof, and the like. In addition to enhancing water compatibility, many of these functional groups are also ionically crosslinkable and can be used to form ionic, interpolymer crosslinks with the second polymer as described below.

Advantageously, the A block has functionality allowing the A block to form interpolymer crosslinks with the second polymer component of the release coating formulation. Advantageously, such crosslinking tends to provide release coatings with improved readhesion characteristics as compared to otherwise identical materials lacking such crosslinkability.

Crosslinking capability can be provided in many ways. According to one approach, suitable for embodiments in which release coatings are formed from nonaqueous formulations, pendant OH functionality on an A block can be crosslinked with pendant OH functionality on the second polymer by incorporating a poly-isocyanate functional crosslinking agent and a suitable catalyst, e.g., dibutyltin dilaurate, into the formulation.

According to still another approach suitable for embodiments of the invention in which release coatings are formed from nonaqueous formulations, radiation crosslinkable functionality (e.g., carbon-carbon double bonds) can also be incorporated into the A blocks and the second polymer so that the A blocks and the second polymer can be crosslinked together using radiation curing techniques. Radiation crosslinkable functionality can be easily incorporated into the A blocks by reacting materials comprising at least one NCO moiety and one carbon-carbon double bond with hydroxy functionality on the A blocks. In this reaction, the NCO group on the difunctional material reacts with the OH group on the A block to form a urethane linkage. The carbon-carbon double bond is preserved and provides the A block with crosslinkable carbon-carbon double bonds as a result. Examples of compounds having both NCO and carbon-carbon double bonds include isocyanatoalkyl esters such as isocyanatoethyl (meth)acrylate known as "IEM", or the isocyanate functional alpha-methyl styrene compound known as "TMI" described in U.S. Pat. No. 5,380,905, or the like.

Alternatively and more preferably for water-based formulations, the A block would include ionically crosslinkable moieties that are capable of undergoing ionic crosslinking reactions with corresponding ionically crosslinkable moieties on the second polymer. Generally, for purposes of achieving ionic crosslinking, acid functionality on one of the polymers is complementary to basic functionality on the other polymer and vice versa. Each of the two polymers may also include both acid and basic functionality to enhance crosslink density, if desired.

Certain kinds of functionality of the A block can also enhance the ink receptivity of release coatings. For example, it has been found that amine, heterocyclic, and/or nitrile functionality can enhance ink receptivity. In order to provide an A block having pendant nitrile groups, one or more nitrile functional, free radically polymerizable monomers may be incorporated into the vinyl copolymeric block A. Representative examples of such monomers include (meth) acrylonitrile, β-cyanoethyl-(meth)acrylate, 2-cyanoethoxyethyl (meth)acrylate, p-cyanostyrene, p-(cyanomethyl)styrene, and the like. Preferably, the nitrile functional, nonhalogenated free radically polymerizable monomer is (meth)acrylonitrile, and more preferably acrylonitrile.

The hydroxyl groups, if any, of the vinyl copolymeric block A may be primary, secondary, or tertiary, although primary and secondary hydroxyl groups are preferred. Generally, preferred vinyl copolymeric blocks of the present invention may have a hydroxyl equivalent weight in the range from about 300 to about 20,000, preferably 700 to 10,000, more preferably 700 to 6000. In order to provide hydroxyl groups, one or more hydroxyl functional, free radically polymerizable monomers may be incorporated into the A block. Representative examples of suitable hydroxyl functional, free radically polymerizable monomers include an ester of an alpha, beta-unsaturated carboxylic acid with a diol, e.g., 2-hydroxyethyl (meth)acrylate, or 2-hydroxypropyl (meth)acrylate; 1,3-dihydroxypropyl-2-(meth)acrylate; 2,3-dihydroxypropyl-1-(meth)acrylate; an adduct of an a,β-unsaturated carboxylic acid with caprolactone; an alkanol vinyl ether such as 2-hydroxyethyl vinyl ether; 4-vinylbenzyl alcohol; allyl alcohol; p-methylol styrene; or the like. Preferably, the hydroxyl functional, free radically polymerizable monomer is selected from 2-hydroxyethyl (meth)acrylate, 2-hydroxypropyl (meth) acrylate, and mixtures thereof. Alternatively, vinyl copolymers with pendant hydroxyl groups can also be prepared by incorporating vinyl acetate into the vinyl copolymer and then partially or fully hydrolyzing the acetate moieties to produce hydroxyl groups.

The quaternary ammonium functionality and/or other ionic, acidic, or basic functionality can be introduced into the vinyl copolymer in a variety of ways. As one approach, ionic initiators may be used to initiate copolymerization. Ionic initiators initiate copolymerization of free radically polymerizable monomers to provide an A block with terminal ionic functionality. Examples of suitable ionic initiators include 4,4'-azobis (cyanovaleric acid), succinic acid peroxide, potassium persulfate, and sodium perphosphate. Another approach for introducing the ionic functionality into the A block is to use a functional chain transfer agent such as mercaptosuccinic acid during copolymerization of the free radically polymerizable monomers.

The ionic, acidic, and/or basic functionality may also be introduced into the A block through the use of a free radically polymerizable material bearing the desired functionality. Representative examples of suitable free radically polymerizable monomers bearing a quaternary ammonium moiety include (meth)acryloyloxyethyl trimethyl ammonium chloride, (meth)acrylamidopropyl trimethylammonium chloride, vinylbenzyl trimethylammonium chloride, 2-hydroxy-3-allyloxypropyl trimethylammonium chloride, (meth)acryloyloxypropyl dimethylbenzylammonium chloride, dimethylaminoethyl (meth)acrylate, vinylbenzyl trimethylammonium chloride, N-(3-sulfopropyl)-N-(meth) acryloyloxyethyl-N,N-dimethylammonium betaine, 2-[(meth)acryloyloxy]ethyl trimethylammonium methosulfate, N-(3-sulfopropyl)-N-(meth)acrylamidopropy-N, N-dimethylammonium betaine, combinations of these, and the like. Most preferably, such monomer is (meth) acryloyloxyethyl trimethylammonium chloride.

Representative examples of suitable free radically polymerizable monomers bearing other kinds of ionic, acidic, or basic groups include (meth)acryloyloxyethyl acid phosphate or salts thereof, (meth)acrylamidopropyl sodium sulfonate, sodium styrene sulfonate, styrene sulfonic acid, (meth) acrylic acid, maleic acid, fumaric acid, maleic anhydride, vinyl sulfonic acid, 2-(meth)acrylamide-2-methyl-1-propanesulfonic acid, maleic anhydride, n-vinyl pyrrolidone (NVP), n-vinyl pyrolidone, N,N-dialkylaminoalkyl (meth) acrylate such as N,N-diethylaminoethyl (meth)acrylate or NN-dimethylaminomethyl (meth)acrylate, and N-t-butylaminoethyl (meth)acrylate; mixtures thereof, and the like.

Ionic, basic, and/or acidic functionality may also be introduced into the A block using suitable post-polymerization reactions. Examples of such reactions include: (1) reaction of succinic anhydride with a portion of the hydroxyl groups on an A block to provide pendant acid functionality; and (2) reaction of a tertiary amine with the epoxy groups on an A block to provide pendant quaternary ammonium groups. In order to provide an A block having a pendant epoxy groups for this reaction, epoxy functional, free radically polymerizable monomers may be incorporated into the vinyl copolymer. Such monomers include, for example, glycidyl ether of an unsaturated alcohol such as allyl glycidyl ether, a glycidyl ester such as glycidyl (meth) acrylate, and the like.

Preferred vinyl copolymers of the present invention desirably also may incorporate one or more other kinds of free radically polymerizable monomers. Representative examples of suitable other kinds of copolymerizable, free radically polymerizable monomers include styrene; alkylated styrenes; alkoxy styrenes; vinyl naphthalene; alkylated vinyl naphthalenes; alkoxy vinyl naphthalenes; (meth) acrylamides; N-vinyl pyrolidone; linear, branched, or alicyclic alkyl esters of (meth)acrylic acid wherein the alkyl groups contain from 1 to 20, preferably 1–8, carbon atoms, such as methyl (meth)acrylate, n-butyl (meth)acrylate, t-butyl (meth)acrylate, ethyl (meth)acrylate, isopropyl (meth)acrylate, and 2-ethylhexyl (meth)acrylate; vinyl esters of alkanoic acids wherein the alkyl moiety of the alkanoic acids contain 2 to 20, preferably 2 to 4, carbon atoms and may be linear, branched, or alicyclic; isobornyl (meth)acrylate; glycidyl (meth)acrylate vinyl acetate; allyl (meth)acrylate, and the like. Preferred free radically polymerizable monomers include styrene, alkyl-substituted styrenes, alkyl (meth)acrylates wherein the alkyl group contains 1 to 4 carbon atoms, and mixtures thereof.

One specific, preferred embodiment of an A block is obtained by copolymerizing monomeric constituents comprising 30 to 50 parts by weight of an alkyl (meth)acrylate per about 50 parts by weight of a free radically polymerizable, basic monomer. The preferred alkyl (meth) acrylate of this embodiment is methyl acrylate and the preferred basic monomer is n-vinyl pyrrolidone (NVP). This particular A block shows excellent adhesion to an underlying substrate, has good water compatibility, good ink receptivity, and is capable of ionically crosslinking with acidic functionality incorporated into the second polymer to form release coatings with excellent release and readhesion characteristics. In particularly preferred embodiments, this A block further incorporates 3 to 10 parts by weight of an acid functional, free radically polymerizable monomer per 100 parts by weight of the silicone-vinyl copolymer in order to further enhance the water dispersability of the resultant silicone-vinyl copolymer. The presently preferred acid functional monomer is acrylic acid.

The silicone-vinyl copolymers of the present invention may be prepared in a variety of ways to form copolymers with a variety of different architectures. Several preparation methods for these copolymers have been described in detail in U.S. Pat. Nos. 5,202,190; 5,200,436; 5,154,962; 5,057,619; 5,089,336; and 5,032,460; as well as in documents cited in the background sections of these patents. Although any of the conventional methodologies can be used to make suitable silicone-vinyl copolymers of the present invention, the preferred approach for making silicone-vinyl copolymers in which one or more A blocks are grafted to a B backbone is described in U.S. Pat. No. 5,032,460.

Generally, U.S. Pat. No. 5,032,460 describes a preparation method in which a mercapto functional silicone chain transfer agent corresponding to block B and the desired monomers, oligomers, and polymers that will be used to form the one or more A blocks are charged to an appropriate reaction vessel. If needed, a suitable free radical initiator is also charged to the vessel. The polymerization reaction may be carried out in a suitable solvent such as methyl ethyl ketone. The reaction is carried out by subjecting the vessel contents to the polymerizing energy, preferably heat energy. The vessel contents beneficially are agitated as the reaction proceeds. Reaction times on the order of 10 to 40 hours have been found to be typical for the reaction to be complete, depending upon the amount and type of solvent used, the reactants, the initiator (if any), the reaction temperature, and the like. Yields on the order of 98% or more are typically obtained. After the resultant silicone-vinyl copolymer is formed, it may be recovered using conventional techniques and then stored, further processed, dispersed or dissolved in water, and/or combined with the other ingredients of the release coating formulation.

For example, to make the resultant silicone-vinyl copolymer waterborne, all or a portion of the reacted solution is charged into a vessel containing 50 to 300, preferably about 200, parts by weight of water and about 1 to 5, preferably about 3, parts by weight of ammonium hydroxide per 100 parts by weight of the reacted solution. The mixture is then subjected to a vacuum strip at a moderately elevated temperature, e.g., 50° C., and 100 mmHg to remove the MEK. Desirably, the resultant aqueous solution contains roughly 10 to 40, typically about 30 weight percent of the silicone-vinyl copolymer in water.

In the practice of the present invention, the silicone-vinyl copolymer is advantageously used in combination with a crosslinkable second polymer, wherein the combination provides the resultant release coatings with many improved properties. Firstly, the combination provides substantially better protection for pressure sensitive adhesives as compared to release coatings containing the silicone-vinyl copolymer without the second polymer. For example, tape samples of the present invention have retained substantially all of their adhesion strength even after aging, whereas tape samples whose adhesive side is protected by a release coating lacking the second polymer lost over half of their adhesion strength in only three days. Release coatings of the present invention also have improved solvent resistance and also are more receptive to pencil, ink, and other markings.

Keeping in mind the discussion below relating to the crosslinkability and the preferred properties and characteristics of the second polymer, the second polymer may generally be any kind of polymer that forms cohesive, durable release coatings with the silicone-vinyl copolymer. Representative examples of such polymers include acrylic polymer, polyurethane, polyester, polyamide, polyimide, vinyl copolymers, polycarbonate, polyolefin, combinations of these, and the like. Preferably, the second polymer is an acrylic polymer or polyurethane, more preferably an acrylic polymer.

In one preferred embodiment, the second polymer has a number average molecular weight of greater than about 50,000, preferably 100,000 to about 1,000,000. It has now been discovered that adhesion and readhesion characteristics of the protected adhesive and solvent resistance of the release coating both correlate to the size of the second polymer. Generally, as the number average weight of the second polymer is increased (i.e., its average size is increased), both the readhesion strength and solvent resistance associated with the resultant release coating are improved. While not wishing to be bound by theory, it is believed that the relatively large size of the second polymer of this embodiment has very low mobility and tends to entangle and help anchor the silicone-vinyl copolymer to the underlying substrate. As a consequence, pressure sensitive adhesives cannot pull the silicone-vinyl copolymer away from the release coating as easily, and the integrity of the pressure sensitive adhesive is preserved. In practical effect, if the adhesive were to pull the silicone-vinyl copolymer away from the release coating, the silicone-vinyl copolymer would tend to contaminate and reduce the tackiness of the adhesive.

Preferably, in embodiments in which the second polymer has a relatively high number average molecular weight, it is preferred that the polymer backbone of the second polymer is linear. This preference is a matter of practical convenience in that it is much easier to synthesize very large, linear polymers as compared to synthesizing comparably sized polymers that have a branched architecture.

In the practice of the present invention, the second polymer and the silicone-vinyl copolymer comprise complementary crosslinkable functionality allowing the two materials to be crosslinked together. Preferably, this is accomplished via chemical crosslinking functionality, radiation crosslinkable functionality, and/or ionic crosslinkable functionality. For chemical crosslinking, a typical crosslinking scheme is based upon the reaction between OH groups and NCO groups. These two moieties tend to react together in the presence of a suitable catalyst, e.g., dibutyl tin dilaurate, to form urethane linkages. Such crosslinking preferably is accomplished by providing OH functionality on both the A block of the silicone-vinyl copolymer and on the second polymer. The two polymers are combined and reacted with a polyisocyanate functional crosslinking agent, which is typically a compound having three or more reactive NCO groups, in the presence of the catalyst in order to carry out the crosslinking scheme. Radiation crosslinking is accomplished via a second polymer comprising radiation crosslinkable groups of the type described above with respect to the silicone-vinyl copolymer. Such moieties undergo crosslinking reactions when the silicone-vinyl copolymer and second polymer comprising such moieties are irradiated with a suitable dosage of energy optionally in the presence of an initiator in accordance with conventional radiation crosslinking techniques.

Alternatively and more preferably, each of the A block and the second polymer include complementary functionality that allows the two materials to ionically crosslink with each other. Ionic crosslinking is the most preferred crosslinking scheme to use when the silicone-vinyl copolymer and the second polymer are formulated into water-based compositions. Ionic crosslinkable functionality preferably is providing by including acidic functionality on one of the materials and basic functionality on the other. Ionic crosslinking may also be achieved by providing cationic functionality on one of the materials and anionic functionality on the other. When a solution of two such materials are combined, the acidic and basic groups (or the anionic and cationic groups, as the case may be) will ionically interact and form ionic crosslinks as the solution is dried to form the release coating. In preferred embodiments, the A block of the silicone-vinyl copolymer includes basic functionality such as an amine group at least for the reason of providing ionic crosslinking capability, and the second polymer includes complementary acidic functionality such as —COOH. The ionic, acidic, and/or basic moieties that can be incorporated into the second polymer are generally of the same kind as are described above in connection with the silicone-vinyl copolymer. In an analogous fashion, such functionality can be incorporated into the second polymer by forming the second polymer from monomeric, oligomeric, and. or polymeric constituents having the desired functionality. Advantageously, such ionic, acidic, and/or basic groups also enhance the compatibility of the second polymer with water.

In particularly preferred embodiments, the second polymer incorporates both the large size and crosslinkable features described above. For example, a specific example of a second polymer incorporating both of such features is a polyurethane polymer having pendant acid functionality and a number average molecular weight of about 60,000. This polyurethane may be obtained from constituents comprising an acid functional diol and a diisocyante. If the acid functional diol is relatively small, i.e., it has a molecular weight of less than about 500, the constituents used to form the second polymer may further comprise a larger diol having an average molecular weight in the range from about 1000 to 5000. A large polyurethane is obtained by reacting these materials together in appropriate molar ratios to build the large, linear polymer chains that are desired. For example, combining, on a relative basis, 1 equivalent of the acid functional diol, 1.2 equivalents of the diisocyanate, and 1 equivalent of the larger diol has been found to be a suitable approach. Dimethylol propionic acid ("DMPA") is a preferred acid functional diol, methylene diisocyanate ("MDI") is a preferred disocyanate, and the TONE 0230 polycaprolactone diol available from Union Carbide Chemicals and Plastics Technology Corp. is a preferred larger diol.

Polyurethane polymers may be formed from constituents comprising the two diols and the diisocyanate in a straightforward, one-step reaction. For example, all of these reactants and a catalytic amount of dibutyltindilaurate are dissolved in a suitable solvent such as methyl ethyl ketone. The solution is then heated at reflux until unreacted NCO can no longer be detected by IR analysis. Typically, the reaction may take about 10 hours to go to completion. To make the resultant polyurethane waterborne, all or a portion of the reacted solution is charged into a vessel containing 100 to 300, preferably about 200, parts by weight of water and about 1 to 5, preferably about 3, parts by weight of ammonium hydroxide per 100 parts by weight of the reacted solution. The mixture is then subjected to a vacuum strip to remove the MEK. Desirably, the resultant aqueous solution contains roughly 10 to 20, preferably about 15 weight percent of the acid functional polyurethane in water.

In particularly preferred embodiments, the second polymer is an acrylic polymer obtained from one or more monomeric, oligomeric, or polymeric free radically polymerizable materials of the type described above with respect to the A blocks of the silicone-vinyl copolymer. A specific example of one acrylic polymer suitable in the practice of the present invention is commercially available in the form of a waterborne latex from Rohm & Haas Company under the trade designation "ASE-60". This acrylic polymer has pendant —COOH functionality.

The Tg of the second polymer correlates to the stability of the surface release characteristics of the release coating over time. Generally, second polymers having higher Tg values tend to provide release coatings with more stable properties. Accordingly, in all embodiments of the second polymer, it is preferred that the second polymer have a Tg of greater than about 40° C. to obtain the best stability. More preferably the Tg is at least about 60° C., most preferably at least about 100° C. As an example, a particularly preferred acid functional polyurethane prepared as described above from, in a relative basis, 1 equivalent of DMPA, 1.2 equivalents of MDI, and 1 equivalent of the TONE 0230 diol has a Tg of 120° C. As another example, the carboxylic acid functional acrylic polymer of the "ASE-60" latex has a Tg of about 55° C.

Compatibility and/or miscibility between the second polymer and the A block(s) of the silicone-vinyl copolymer also correlates to better performance. As used herein, two polymer materials are compatible when the two materials combine and form a single phase blend. On the other hand, two polymer materials are miscible if a blend of the two materials exhibits a single Tg or Tm, as the case may be. It is preferred that the second polymer be miscible, compatible, or both with the A block(s) of the silicone-vinyl copolymer. Because acrylic polymers tend to be miscible and compatible with the A block (which is itself acrylic in nature), the second polymer preferably is an acrylic polymer as well.

The relative amounts of the silicone-vinyl copolymer and second polymer incorporated into a release coat formulation can vary within a wide range depending upon factors such as the characteristics of each polymer, the intended use, and the like. Generally, adhesion of pressure sensitive adhesives to the coating tends to go down as the level of the silicone-vinyl copolymer in the coating is increased. This is due to the higher silicone content of such coatings. On the other hand, increasing the level of the second polymer in the coating tends to improve the attachment of the release coating to the underlying substrate. Balancing these concerns, and as suggested guidelines, the combination of the silicone-vinyl copolymer and the second polymer desirable includes enough of the silicone-vinyl copolymer to provide the desired release characteristics. In practice, formulations comprising a ratio of the silicone-vinyl copolymer to the second polymer in the range from about 1:100 to 100:1. preferably 30:70 to 70:30, more preferably 50:50, on a weight basis, would be suitable in the practice of the present invention.

In addition to the silicone-vinyl copolymer and the second polymer, the release coating formulation may also contain additional ingredients in order to achieve desired performance criteria. For example, fillers, pigments, colorants, fungicides, antistatic agents, anti-gloss agents, and the like may be used in order to improve aesthetics or surface texture, extend shelf-life, reduce static charge build-up, reduce gloss, to impart a surface more receptive to marking with pencils, inks, and paints, and the like. A particularly preferred anti-gloss agent comprises a gloss reducing amount of fumed silica. Advantageously, fumed silica diffuses light and thereby helps to reduce the gloss of release coatings into which fumed silica is incorporated. Unlike many antigloss agents, fumed silica is easily dispersed in water to form homogeneous, aqueous, release coating formulations.

The silicone-vinyl copolymer, second polymer, and optional ingredients if any are advantageously used to form release coatings on the surfaces of a wide range of substrates. Examples of substrates include items which are made from paper, wood, metal (including sheets, foils, bars, and the like), polymer material (including polyesters, polyurethanes, vinyl copolymers, polyolefins, polycarbonates, polyimides, polyamides, epoxy polymers, combinations of these, and the like), glass and other ceramics, woven and non-woven fabrics, or any other surface requiring release toward adhesives. If desired, substrates such as a polyolefin substrate, can be primed to improve adhesion of the coating to the substrate.

Because the level of release can be easily tailored over a wide range, release coatings of the present invention can be used in a correspondingly wide variety of different applications. Representative uses include release coatings for pressure sensitive labels, backsizes for adhesive tape having woven or non-woven backings (including, e.g., masking tape, gaffer's tape, transfer tape, transparent tape, duct tape, packaging tape, construction tape, medical tape, cloth tape, and the like.

Release coating compositions are conveniently formulated as a solution, dispersion, or latex by dissolving or dispersing the components of the release coating in a suitable solvent. When the silicone-vinyl copolymer and second polymer are ionic, both are dispersible in water. This allows water to be used as the solvent. Typically, such compositions contain enough solvent so that the compositions have a suitable coating viscosity, which may vary depending upon how the composition will be applied to the substrate. Aqueous dispersions containing 2 to 10 weight percent solids are preferred. Optionally, the pH of the composition can be adjusted by adding minor amounts of an acid or base in order for the composition to exhibit the desired ionic characteristics for carrying out the coating operation.

The release coating composition may be applied to the desired substrate using conventional coating techniques, such as brushing, spraying, spin-coating, wire-wound rod coating direct gravure coating, offset gravure coating, reverse roll coating, air knife coating, trailing blade coating, hot melt coating, electrostatic coating, dipping, curtain coating, and the like. After being applied to the substrate, the coating is dried and/or otherwise cured. In those embodiments in which the silicone-vinyl copolymer and the second polymer include ionically crosslinkable moieties, such moieties will tend to ionically interact and crosslink as the coating dries. In those embodiments in which the silicone-vinyl copolymer and the second polymer bear crosslinkable OH groups (generally, these embodiments involve nonaqueous compositions), these will tend to begin to crosslink as soon as the NCO functional crosslinking agent and the catalyst are added to the solution. Accordingly, the composition should be used rather quickly after these agents are added to the composition. However, it will take some time for the OH/NCO crosslinking reaction to go to completion.

For purposes of illustration, the present invention will now be described in connection with a roll of adhesive tape. A typical roll of adhesive tape includes a backing having first and second opposed major surfaces. The backing may be a single ply or layer of material, but in actual practice may also be a laminate structure in accordance with conventional practices. If made of cloth, the backing can be woven or non-woven. A pressure sensitive adhesive layer is positioned over first major surface of the backing, and a backsize, or release coating, is positioned over second major surface of the backing. As an option, each of the backsize and the pressure sensitive adhesive layers can be coated directly onto the backing without any intervening layers. However, in accordance with conventional practices, one or more other kinds of layers may be interposed between the backing and either or both of the adhesive layer and/or the backsize.

The backsize serves as a release coating and incorporates a silicone-vinyl copolymer and a second polymer in accordance with the present invention. As a consequence, the backsize is strongly anchored to underlying layer, in this case the backing itself, but the tape is easily unwound from the roll with stable release properties over time. The present invention will now be further described with reference to the following examples.

Water-borne Polymer Sample A

Silicone-Vinyl Copolymer with Acid and Basic Functionality

In a one-liter narrow mouth jar were charged 49.8 g methyl acrylate (MA), 75 g n-vinyl pyrrolidone (NVP), 67.2 g of KF2001 mercapto functional silicone available from Shin-Etsu Corp., Japan, 8.0 g acrylic acid (AA), 300 g methyl ethyl ketone (MEK) and 0.4 g 2,2'-azobisiosbutyronitrile (VAZO 64 available from Dupont). The resulting mixture was purged with nitrogen at 1 liter per minute for 5 minutes. The jar was sealed and the mixture polymerized in a constant temperature bath at 55° C. for 24 hrs. After polymerization, % solids were measured and conversion was calculated to be 98.5%.

The above solution was then charged to a gallon jar containing 466 g deionized water and 6.8 g of a 30% (w/w) aqueous ammonium hydroxide solution. The resulting mixture was kept on a table top shaker for about 30 minutes to obtain a homogeneous dispersion which was subjected to a vacuum strip at 50° C. and 100 mm Hg pressure to strip off the MEK. After most of the MEK was stripped off, % solids of the resulting waterborne dispersion was measured to be about 30% by weight.

Polymer Sample B

Synthesis of a Carboxylated Polyurethane

In a 5 liter reaction vessel, 201.9 g (3.01 equivalents) dimethylol propionic acid (DMPA), 458.1 g (3.66 equivalents) methylene diioscyanate (MDI), 540.0 g (3.00 equivalents) of TONE 230 (a polyester polycaprolactone diol available from Union Carbide Chemicals & Plastics Technology Corp.) and 3 drops (~90 mg) of dibutyl tin dilaurate (DBTDL) catalyst were dissolved in 1800 g MEK. The solution was heated at reflux for 10 hours whereupon no unreacted isocyanate was detectable by infrared analysis. The acid content of this polymer was calculated to be 1.3 meq/g.

To make waterborne, 100 g of the above solution was charged in ajar containing 226 g deionized water and 3 g of a 30% (w/w) ammonium hydroxide solution. The resulting homogeneous solution was subjected to a vacuum strip to remove MEK and to obtain 14.6% by weight carboxylated polyurethane in water.

Polymer Sample C

Synthesis of Acrylic Polymer without Carboxylic Acid Functionality

In a 2-liter resin flask equipped with a condenser, nitrogen inlet, and an agitator were charged 800 ml deionized water and 4 g sodium dodecyl sulfate surfactant. The resulting mixture was stirred at 250 rpm. To the stirred solution was charged a premix of 240 g butyl methacrylate (BMA), 160 g methyl methacrylate (MMA) and 0.80 g isooctylthioglycolate (chain transfer agent) followed by 0.80 g ammonium thiosulfate, 0.4 g sodium persulfate and 2 ml 0.15% solution of $FeSO_4.7H_2O$. The resulting stable dispersion was polymerized at 35° C. (exothermed to 56° C.) for about 4 hours to obtain 33.4% solids latex which was diluted to 30% solids with deionized water.

EXAMPLE 1

50/50 Blend of Sample A and ASE-60 Latex

"Acryosil ASE-60" is a trade designation for a 30% (w/w) acrylic latex available from Rohm & Haas Company. In a 500-ml open-mouthed jar were charged 15 g ASE-60 latex and 15 g waterborne polymer of Sample A. The resulting viscous solution was diluted to 6% solids by adding 120 g deionized water.

EXAMPLE 2

40/60 Blend of Sample A and ASE-60 Latex

The procedure of example 1 was repeated except that 8 g waterborne polymer of Sample A and 12 g ASE-60 latex were combined and then diluted with 80 g deionized water.

EXAMPLE 3

30/70 Blend of Sample A and ASE-60 Latex

The procedure of example 1 except that 6 g waterborne polymer of Sample A and 14 g ASE-60 latex were combined and then diluted with 80 g deionized water.

EXAMPLE 4

50/50 Blend of Sample A and Sample B (Carboxylated Polyurethane)

10 g of the waterborne polymer of Sample A and 20.6 g of the waterborne carboxylate polyurethane of Sample B (14.6% w/w) were charged to a 500 ml open mouthed jar followed by dilution with 69.4 g deionized water.

EXAMPLE 5 (Comparison)

50/50 Blend of Sample A and Sample C Copolymer Latex 5 g of waterborne polymer of Sample A and 5 g of the Sample C latex preparation were charged to a 500 ml open mouthed jar followed by 50 g deionized water.

EXAMPLE 6

Dispersion of Syloid 169 Fumed Silica (1%) in Example 1 Solution

In a 200 ml open mouthed jar were charged 100 g of waterborne blend of Example 1 followed by 1 g Syloid 169 fumed silica (available from Davison Chemical, A Grace Division). The resulting heterogeneous mixture was put on a roller at high speed for 4 hours to obtain a relatively stable dispersion which had a shelf life of about 6 hours before a small amount of fumed silica began to settle out.

EXAMPLE 7

Dispersion of Syloid 169 Fumed Silica (2%) in Example 1 Solution

The procedure of Example 6 was followed except that 100 g waterborne blend of Example 1 and 2 g Syloid 169 fumed silica were used.

EXAMPLE 8

Dispersion of Syloid 234 Fumed Silica (1%) in Example 1 Solution

The procedure of Example 6 was followed except that 100 g waterborne blend of Example 1 and 1 g Syloid 234 fumed silica (available from Davison Chemical, A Grace Division) were used.

EXAMPLE 9

Dispersion of Syloid 234 Fumed Silica (2%) in Example 1 Solution

The procedure of Example 5 was followed except that 100 g waterborne blend of Example 1 and 2 g Syloid 234 fumed silica were used.

EXAMPLE 10

Measurement of Gloss

Respective samples of polyvinyl chloride (PVC) coated print cloth backing (available from Aurora Textile & Finishing Co., Aurora, Ill.) were independently coated on the PVC coated side on top of the PVC coating with the blend of Example 1 and the dispersions of Examples 6 through 9, respectively, using a #6 wire wound Meyer rod. The resulting coated backings were dried in an oven at 65° C. for 30 minutes and conditioned for 1 hr at 22° C. and 50% relative humidity (RH). Gloss of each coated sample was measured at 60° using a HunterLab Modular Glossmeter (Model D48-7; available from Hunter Assoc. Laboratory, Inc., Reston, Va.) according to the procedure found in Section 4 of the Operating Manual. The machine was allowed to warm up one hour prior to taking the measurements. Six readings were taken from random areas on each sample and the results averaged. The results are set out in TABLE 1.

TABLE 1

| Example | 60° Gloss |
| --- | --- |
| 1 | 1.9 |
| 6 | 1.55 |
| 7 | 1.3 |
| 8 | 1.5 |
| 9 | 1.05 |

EXAMPLE 1, which did not contain fumed silica, had a 60° gloss measurement of 1.9, indicating that it was relatively shiny compared to Examples 6 through 9. Examples 6 through 9 show the effect of addition of fumed silica on 60° gloss. With addition of 1 to 2% fumed silica (Examples 6 through 9), there was a substantial drop in 60° gloss and the least shiny substrate was obtained when 2% Syloid 234 was dispersed in Example 1.

EXAMPLE 11

Peel and Adhesion Performance

The test method used to evaluate release coated flexible sheet materials of these Examples is a modification of the industry standard peel adhesion test used to evaluate pressure sensitive adhesive (PSA) coated materials. The standard test is described in detail in various publications of the American Society for Testing and Materials (ASTM), Philadelphia, Pa., and the Pressure Sensitive Tape Council (PSTC), Glenview, Ill. The modified standard method is described in detail below. The reference source of the standard test method is ASTM D3330-78 PSTC-1 (11/75).
Immediate Peel and Adhesion Values The immediate peel value is a quantitative measure of the force required to remove a flexible adhesive tape from a substrate coated with the test composition at a specific angle and rate of removal. In the following examples, this force is expressed in grams per 2.54 cm (g/2.54 cm).

Respective portions of each polymer blend composition prepared in Examples 1 through 9 and also Sample A by itself were independently coated with a #6 wire wound Meyer rod onto a corona treated polyvinyl chloride (PVC) coated print cloth backing (available from Aurora Textile & Finishing Co., Aurora, Ill.), dried in a 65° C. oven for 30 minutes and conditioned for 1 hour at 22° C. and 50% relative humidity (RH).

Immediate peel testing was conducted by laminating a 2.54 cm by 20.32 cm strip of each coated backing (coated side up) to the stage of an Instromentors, Inc. slip/peel tester (model 3M90) with double coated tape. A 2.54 cm by 15.24 cm strip of a PSA coated test tape was rolled down onto the laminate thus formed with a 1.82 kg rubber roller. The PSA tape included a high-tack (meaning that the adhesive had an adhesion to glass in the range of 1134 g/2.54 cm to 2267 g/2.54 cm) rubber resin PSA (having a Tg of about −20° C.) coated at 125 g/m$^2$ onto the PVC coated backing noted above. The force required to remove the tape at 180° and 228.6 cm/minute was then measured. The results were recorded in TABLE 2 as the immediate peel force.

The freshly peeled PSA coated test tape was then adhered to a clean glass plate using a 1.82 kg roller and the force required to remove the tape at 180° and 228.6 cm/minute was then measured. The results were recorded in TABLE 2 as the immediate adhesion to glass.

Aged Peel and Adhesion Values

Aged peel testing was conducted in a similar manner to the immediate peel testing with the exception of allowing the test tape to dwell in contact with the coated backing for three days at 65° prior to removal. The force required to remove the tape within 1 minute at 180° and 228.6 cm/minute from the coated backing was measured and the results were recorded in TABLE 2 as the aged peel force.

For these aged test tapes, adhesion was measured by adhering the freshly peeled tape to a clean glass plate and measuring the adhesion in normal fashion using the same Instrumentors slip/peel tester indicated above. The results were recorded in TABLE 2 as the aged adhesion to glass.

TABLE 2

| Example | Immediate Peel Force (g/2.54 cm) | Aged Peel Force (g/2.54 cm) | Immediate Adhesion to glass (g/2.54 cm) | Aged Adhesion to glass (g/2.54 cm) |
| --- | --- | --- | --- | --- |
| Sample A | 357.2 | 416.7 | 1312.6 | 595.3 |
| 1 | 601.0 | 601.0 | 1553.6 | 1389.1 |
| 2 | 518.8 | 493.3 | 1695.3 | 1695.3 |
| 3 | 433.7 | 524.5 | 1621.6 | 1474.2 |
| 4 | 714.4 | 708.7 | 1814.4 | 1621.6 |
| 5 Comparison) | 425.2 | 652.0 | 1134.0 | 793.8 |
| 6 | 623.7 | 737.1 | 1672.6 | 1360.8 |
| 7 | 708.7 | 708.7 | 1389.1 | 1360.8 |
| 8 | 708.7 | 708.7 | 1360.8 | 1389.1 |
| 9 | 680.4 | 722.9 | 1539.4 | 1360.8 |

Without the presence of any second polymer of any kind (Sample A by itself), the results show that there is about 55% loss in adhesion after 3 days of aging. In contrast, with the addition of 50% and 60% of a second polymer (Examples 1 and 2), the loss in adhesion drops to only about 10% and 0%, respectively. While not wishing to be bound to theory, it is believed that Examples 1 and 2 provide ionic crosslinking between grafted NVP moieties (which are basic) of the silicone vinyl copolymer and the acrylic acid moieties of the acid functional acrylic polymer of the ASE-60 latex. Such crosslinking is believed to prevent transfer of the release coating to the adhesive. The same kind of phenomenon is observed in Example 4 where second polymer is polyurethane which contains carboxylic acid functionality. In contrast, when a second polymer without ionic crosslinking functionality is used (Example 5, Comparison), there is a substantial loss in adhesion if the second polymer.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

What is claimed is:

1. A release coating comprising the crosslinked product of:
   a copolymer comprising at least one silicone block and at least one vinyl copolymeric block; and
   a second polymer that is different from said copolymer, and selected from the group consisting of acrylic polymers, polyurethanes, polyesters, polyamides, polyimides, vinyl copolymers, polycarbonates, polyolefins, and combinations thereof;
   wherein one of said copolymer and said second polymer comprises an acidic moiety and the other comprises a basic moiety, and wherein said at least one vinyl copolymeric block of said copolymer comprises, per 100 parts by weight of the copolymer, 35 to 50 parts by weight of a nonionic free radically polymerizable monomer, 20 to 45 parts by weight of a free radically polymerizable monomer having a basic moiety, and 2 to 5 parts by weight of a free radically polymerizable monomer having an acidic moiety.

2. The coating of claim 1, wherein said free radically polymerizable monomer having a basic moiety is selected from the group consisting of n-vinyl pyrolidone, N,N-dialkyllaminoalkyl (meth)acrylate, and combinations thereof.

3. The coating of claim 1, wherein said second polymer has a number average molecular weight ranging from 50,000 to 1,000,000.

4. The coating of claim 3, wherein said second polymer has a Tg of at least 40° C.

5. The coating of claim 3, wherein said second polymer is miscible or compatible with said at least one vinyl copolymeric block of said copolymer.

6. The coating of claim 1, wherein said copolymer comprises said basic moiety and said second polymer comprises said acidic moiety.

7. The coating of claim 1, wherein the weight ratio of said copolymer to said second polymer ranges from 1:100 to 100:1.

8. The coating of claim 1, wherein the weight ratio of said copolymer to said second polymer ranges from 2:3 to 3:2.

9. The coating of claim 1, further comprising fumed silica.

10. The coating of claim 1, wherein said substrate is woven.

11. The coating of claim 1, wherein said substrate is non-woven.

12. The coating of claim 1, wherein said copolymer is a graft copolymer.

13. The coating of claim 1, wherein said copolymer is a block copolymer.

14. A coatable composition comprising:
   a copolymer comprising at least one silicone block and at least one vinyl copolymeric block; and
   a second polymer that is different from said copolymer, and selected from the group consisting of acrylic polymers, polyurethanes, polyesters, polyamides, polyimides, vinyl copolymers, polycarbonates, polyolefins, and combinations thereof;
   wherein one of said copolymer and said second polymer comprises an acidic moiety and the other comprises a basic moiety and wherein said at least one vinyl copolymeric block comprises, per 100 parts by weight of the copolymer, 35 to 50 parts by weight of a nonionic free radically polymerizable monomer, 20 to 45 parts by weight of a free radically polymerizable monomer having a basic moiety, and 2 to 5 parts by weight of a free radically polymerizable monomer having an acidic moiety.

15. The coatable composition of claim 14, wherein said free radically polymerizable monomer having a basic moiety is selected from the group consisting of n-vinyl pyrolidone, N,N-dialkyllaminoalkyl (meth)acrylate, and combinations thereof.

16. The coatable composition of claim 14, wherein said second polymer has a number average molecular weight ranging from 50,000 to 1,000,000.

17. The coatable composition of claim 16, wherein said second polymer has a Tg of at least 40° C.

18. The coatable composition of claim 16, wherein said second polymer is miscible or compatible with said at least one vinyl copolymeric block of said copolymer.

19. The coatable composition of claim 14, wherein said copolymer comprises said basic moiety and said second polymer comprises said acidic moiety.

20. The coatable composition of claim 14, wherein the weight ratio of said copolymer to said second polymer ranges from 1:100 to 100:1.

21. The coatable composition of claim 14, wherein the weight ratio of said copolymer to said second polymer ranges from 2:3 to 3:2.

22. The coatable composition of claim 14, further comprising fumed silica.

23. The coatable composition of claim 14, wherein said copolymer is a graft copolymer.

24. The coatable composition of claim 14, wherein said copolymer is a block copolymer.

25. An adhesive tape having first and second major surfaces, wherein the tape comprises a pressure sensitive adhesive layer proximal to the first major surface and a release coating proximal to the second major surface, wherein a composition comprising:
 a copolymer comprising at least one silicone block and at least one vinyl copolymeric block; and
 a second polymer that is different from said copolymer, and selected from the group consisting of acrylic polymers, polyurethanes, polyesters, polyamides, polyimides, vinyl copolymers, polycarbonates, polyolefins, and combinations thereof;
wherein one of said copolymer and said second polymer comprises an acidic moiety and the other comprises a basic moiety, is coated on said second major surface and crosslinked to form said release coating.

26. The tape of claim 25, wherein said at least one vinyl copolymeric block of said copolymer comprises, per 100 parts by weight of the copolymer, 35 to 50 parts by weight of a nonionic free radically polymerizable monomer, 20 to 45 parts by weight of a free radically polymerizable monomer having a basic moiety, and 2 to 5 parts by weight of a free radically polymerizable monomer having an acidic moiety.

27. The tape of claim 26, wherein said free radically polymerizable monomer having a basic moiety is selected from the group consisting of n-vinyl pyrolidone, N,N-dialkyllaminoalkyl (meth)acrylate, and combinations thereof.

28. The tape of claim 25, wherein said second polymer has a number average molecular weight ranging from 50,000 to 1,000,000.

29. The tape of claim 28, wherein said second polymer has a Tg of at least 40° C.

30. The tape of claim 28, wherein said second polymer is miscible or compatible with said at least one vinyl copolymeric block of said copolymer.

31. The tape of claim 25, wherein said copolymer comprises said basic moiety and said second polymer comprises said acidic moiety.

32. The tape of claim 25, wherein the weight ratio of said copolymer to said second polymer ranges from 1:100 to 100:1.

33. The tape of claim 25, wherein the weight ratio of said copolymer to said second polymer ranges from 2:3 to 3:2.

34. The tape of claim 25, wherein said coatable composition further comprises fumed silica.

35. The tape of claim 25 wherein said copolymer is a graft copolymer.

36. The tape of claim 25 wherein said copolymer is a block copolymer.

37. The tape of claim 25, wherein said tape further comprises a woven backing.

38. The tape of claim 25, wherein said tape further comprises a non-woven backing.

39. A method of forming a release coating on a substrate, comprising:
 a providing a coatable composition comprising:
  a copolymer comprising at least one silicone block and at least one vinyl copolymeric block; and
  a second polymer that is different from said copolymer, and selected from the group consisting of acrylic polymers, polyurethanes, polyesters, polyamides, polyimides, vinyl copolymers, polycarbonates, polyolefins, and combinations thereof;
 wherein one of said copolymer and said second polymer comprises an acidic moiety and the other comprises a basic moiety, and wherein said at least one vinyl copolymeric block of said copolymer comprises, per 100 parts by weight of the copolymer, 35 to 50 parts by weight of a nonionic free radically polymerizable monomer, 20 to 45 parts by weight of a free radically polymerizable monomer having a basic moiety, and 2 to 5 parts by weight of a free radically polymerizable monomer having an acidic moiety;
 b. coating said coatable composition on said substrate; and
 c. crosslinking said coatable composition to form said release coating.

40. The method of claim 39 wherein said free radically polymerizable monomer having a basic moiety is selected from the group consisting of n-vinyl pyrolidone, N,N-dialkyllaminoalkyl (meth)acrylate, and combinations thereof.

41. The method of claim 39, wherein said second polymer has a number average molecular weight ranging from 50,000 to 1,000,000.

42. The method of claim 41, wherein said second polymer has a Tg of at least 40° C.

43. The method of claim 39, wherein said second polymer is miscible or compatible with said at least one vinyl copolymeric block of said copolymer.

44. The method of claim 39, wherein said copolymer comprises said basic moiety and said second polymer comprises said acidic moiety.

45. The method of claim 39, wherein the weight ratio of said copolymer to said second polymer ranges from 1:100 to 100:1.

46. The method of claim 39, wherein the weight ratio of said copolymer to said second polymer ranges from 2:3 to 3:2.

47. The method of claim 39, wherein said coatable composition further comprises fumed silica.

48. The method of claim 39 wherein said copolymer is a graft copolymer.

49. The method of claim 39 wherein said copolymer is a block copolymer.

50. The method of claim 39, wherein said substrate comprises a woven backing.

51. The method of claim 39, wherein said substrate comprises a non-woven backing.

* * * * *